United States Patent [19]
Kolibas

[11] 3,825,338
[45] July 23, 1974

[54] OPTICAL SYSTEM WITH SELECTABLE FEEDS

[75] Inventor: James A. Kolibas, Broadview Heights, Ohio

[73] Assignee: Addressograph-Multigraph Corporation, Cleveland, Ohio

[22] Filed: Oct. 12, 1972

[21] Appl. No.: 297,138

[52] U.S. Cl.......................... 355/50, 355/8, 355/25
[51] Int. Cl. ............................................ G03b 27/10
[58] Field of Search............. 355/25, 50, 51, 64, 65, 355/11, 8

[56] References Cited
UNITED STATES PATENTS

| | | | |
|---|---|---|---|
| 3,044,351 | 7/1962 | Patterson | 355/64 |
| 3,597,074 | 8/1971 | Murgas et al. | 355/25 |
| 3,677,635 | 7/1972 | Van Auken et al. | 355/25 X |
| 3,700,326 | 10/1972 | Murgas et al. | 355/14 |
| 3,741,646 | 6/1973 | Knechtel et al. | 355/50 |

Primary Examiner—Samuel S. Matthews
Assistant Examiner—E. M. O'Connor
Attorney, Agent, or Firm—Ray S. Pyle; Russell L. Root

[57] ABSTRACT

A duplicating machine which accepts original documents either in a flow-feed mode in which the documents move across the illumination station of an optical system in one direction only or in a platen-feed mode in which three-dimensional documents such as books are transported relative to the same illumination station in feed and return directions by a reciprocable carrier or platen. The mechanism for flow-feed is also mounted on the carrier or platen. The optical system casts an image of a portion of the original document or all of the document on a photoconductive drum. By means of a novel drive system, movement of the documents is accurately synchronized with movement of the drum on which they are imaged, to produce high image resolution even when the dual feed mechanism is employed in a progressively scanning optical system.

8 Claims, 7 Drawing Figures

OPTICAL SYSTEM WITH SELECTABLE FEEDS

BACKGROUND OF THE INVENTION

Slit scan duplicating machines utilize optical systems which at any instant view only a slit-shaped portion of the document to be copied. The boundaries of the region being viewed are moved on the document to scan the entire document. One method for accomplishing the scanning is to transport the original document progressively past a viewing or illumination station having a slit-shaped field of view so that over a period of time the optical system effectively scans the entire document. The length of the slit ordinarily equals or exceeds the width of the document. One method of the prior art for transporting original documents, especially single sheets, past the viewing station is called a flow-feed system. Another method, which is more suitable for bulky three-dimensional objects such as books, is called a platen-feed system.

In the flow-feed system a single sheet original document is fed into the nip of contra-rotating rollers which engage it and move it past the viewing station with a controlled motion. No structural elements of the duplicating machine need accompany the original sheet in this mode of feeding. The flow-feed method is relatively fast, depositing the original sheets at an exit station of the feed mechanism.

The platen-feed system has a carrier which is designed to support the original document such as a book, and to accompany the document while transporting it with a controlled motion past the viewing station of the optical system to effect an optical scan. The platen-feed method is more convenient for bulky objects of a variety of shapes but is inherently slower than the flow-feed method largely because the platen which supports the original document during its scanning motion must be returned to a starting position after the scan.

SUMMARY OF THE INVENTION

In accordance with the present invention, single sheets can be transported in one direction past the viewing station of the optical system when the relatively fast flow-feed method is selected and books and other documents can be reciprocated past the same viewing station by means of platen transport components when the platen-feed method is selected. In the preferred machine a drive system drives part of the image viewing and receiving means in precise synchronism with movement of the original document past the viewing station to project the image onto an image receiving area, preferably a drum with a photoconductive surface. The part of the image viewing and receiving means is driven in precise synchronism with the movement of the feeding means by drive means which is selectively actuated depending on whether a flow-feed or platen feed mode or operation is selected.

Advantages and features of the invention will become apparent upon consideration of the following description taken in conjunction with the accompanying drawings.

DESCRIPTION OF THE PREFERRED EMBODIMENT

Figure 1:
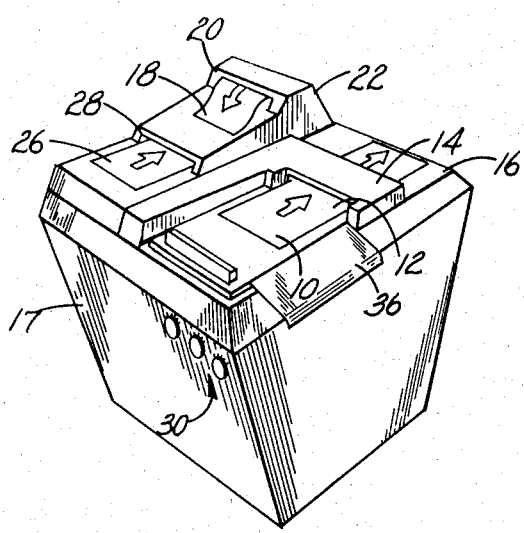
FIG. 1 shows a reproduction machine being used in a flowfeed mode of feeding the originals.

In a preferred embodiment of the invention, as shown in FIG. 1, single sheet originals 10 are entered in a face-down position into a duplicating machine manually at an opening 12. The sheets are engaged by rollers in the machine and transported at a uniform speed through a covered area 14 and deposited on a table 16 from which they may be picked up by the oprator. The original sheets 10 are scanned by an optical system as they pass under the covered area 14, the optical system having a slit-shaped field of view with the length of the slit spanning the entire width of the original sheets transverse to their direction of motion. The optical system produces an image on a rotating drum which is inside a cabinet 17. Copies on paper 18 are shown exiting from the machine, face up, through an opening 20. If desired, the copies may be brought out instead through a second opening 22 at the back of the machine in a face-down position, and may go into a collating device. The copies are made on plain bond paper which is stored in roll form within the cabinet 17 and which is cut into sheets automatically as required during the reproduction operation. When colored paper or some other exceptional paper is to be used for the reproductions, exception sheets 26 may be inserted into the machine at an opening 28 so that copies may be made upon the exception sheet paper 26 instead of upon the roll form paper stored in the machine. Controls 30 are provided for selecting the mode of operation and for otherwise controlling the machine. In the flow-feed method of operation of the illustrated machine, only the original documents have translational motion, with the covered portion 14 being stationary.

Figure 2A:
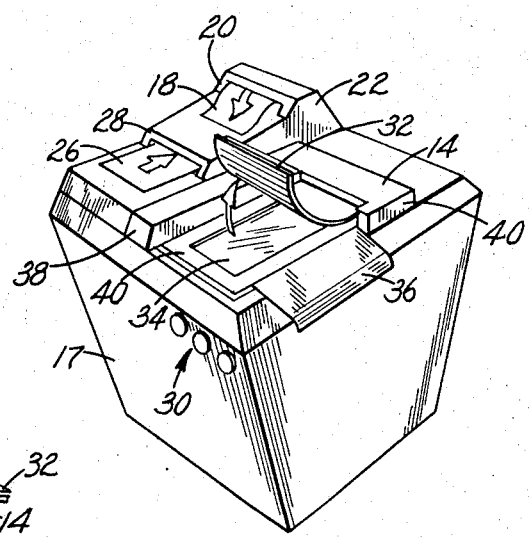
FIG. 2a depicts the same duplicating machine with a flap partially lifted preparatory to duplicating an object by the platenscan method.
Figure 2B:
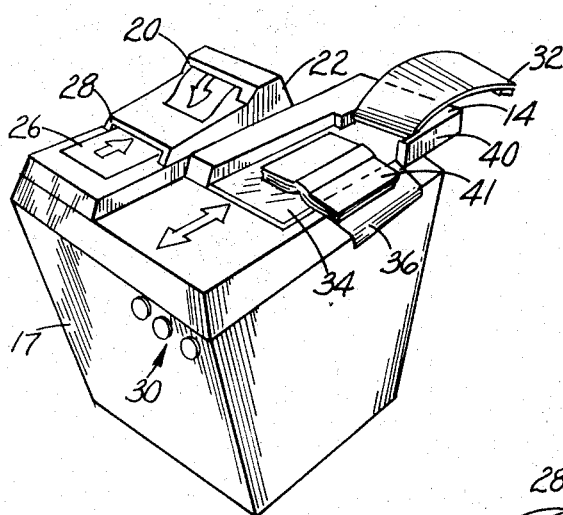
FIG. 2b shows a book on the platen being optically scanned by the duplicating machine, with the platen and book near an extreme rearward position of their scan cycle.

A second feed method of which the machine is capable is illustrated in FIGS. 2a and 2b. In FIG. 2a a flap 32 is shown partially lifted exposing a glass platen surface 34 upon which an original document may be placed face down. A book rest 36 is provided for support of portions of the original document which are out of the field of view. The covered portion 14, the glass portion 34 and its supporting frame, and other portions such as book rest 36 and leg 38 are all part of a movable assembly called the platen 40. The platen 40 is mounted on linear bearings for reciprocably transporting documents past the input of the optical system which is inside the cabinet 17 by moving the platen 40 from a forward position to a rearward position and return.

In FIG. 2b a book 41 is shown in place on the glass portion 34 of the platen and the book rest 36. The entire platen 40 is shown near its extreme rearward position where it reverses direction. The book is scanned by the optical system while the platen 40 moves rearwardly to this position from the position shown in FIG. 2a. Following the scanning step, the platen 40 is automatically slid back to its original position shown in FIG. 2a.

Figure 3:
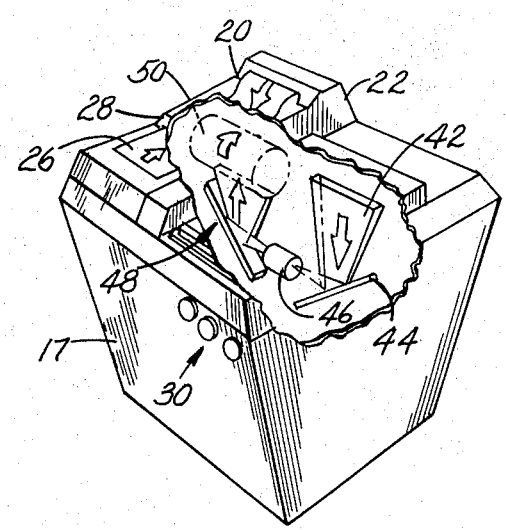
FIG. 3 is a cut-away view of the duplicating machine showing an optical path from the original document to the drum where the image is received.

During the scanning operation, a portion of the original document 10 or 41 is illuminated by a light source, to be described in more detail below, and light reflected from the original document travels downward into an optical system shown isometrically in FIG. 3 and diagramatically in FIGS. 4 and 5a. Reflected light rays which pass from the original document through a space 42 impinge upon an inclined first-surface mirror 44 where they are reflected generally horizontally through a lens 46 and thence to another first-surface mirror 48. The second mirror 48 reflects the light upward onto the surface of a rotating drum 50 which is covered with a photo-conductive material.

The lens 46 is a convergent type suitable for forming an image of a portion of the original document within its field of view at or near the surface of the drum 50. Two masks, not shown, each having a slit for defining the field of view of the scanning system, can be located on the optical path near the original document and just below the surface of the drum 50. The drum 50 is driven rotationally in precise synchronism with the movement of the original document 10 past the viewing station of the optical system, the lineal speed of the surface of the drum 50 being equal to the lineal speed of the image of the document.

Figure 4:
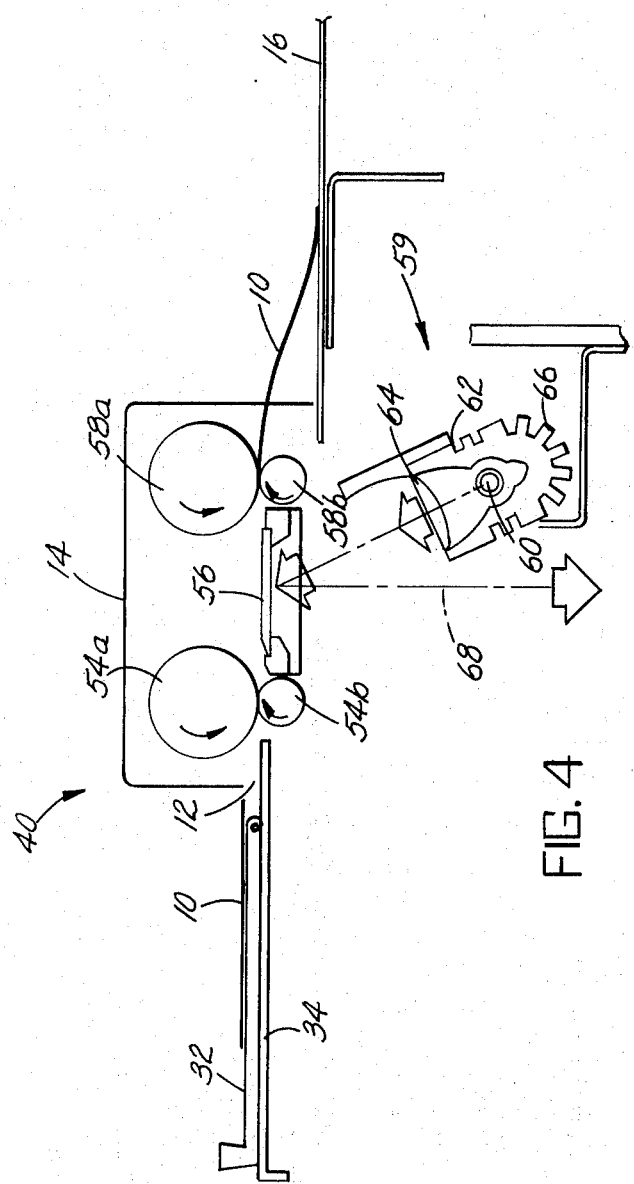
FIG. 4 is a side elevation, cut-away view of the platen and a light source which illuminates the original documents, showing also the direction of input of light to the optical system.
Figure 5A:
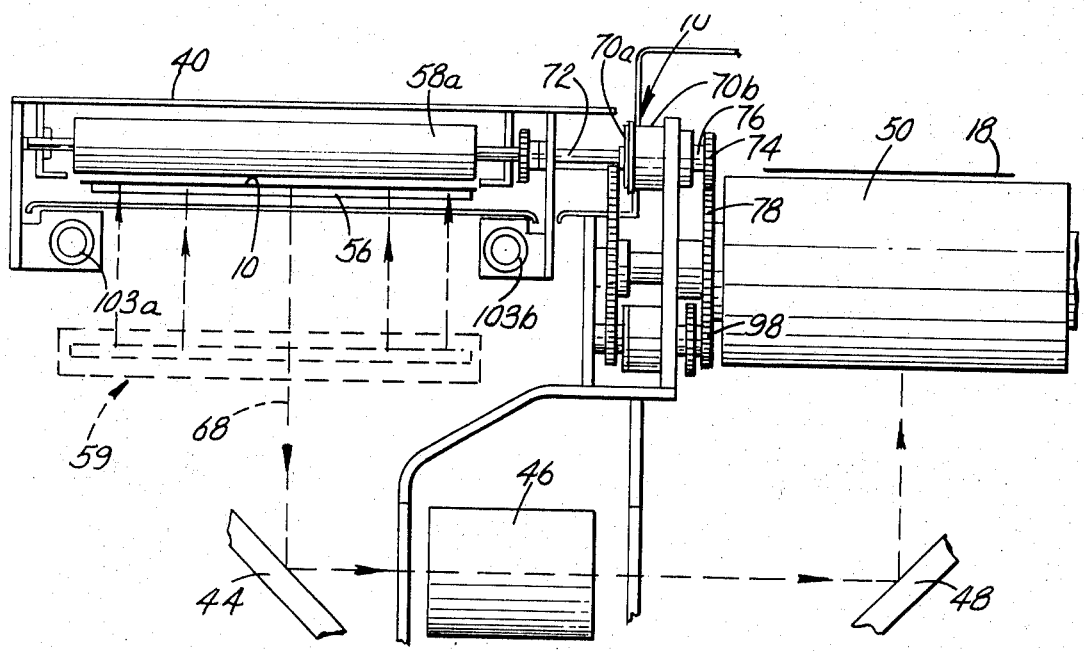
FIG. 5a shows some key elements of the selectable feed system, the optical system and the drum for storing latent images; and, FIG. 5b is another view of the selectable feed system with the lengths of most of the rotating shafts exaggerated in order to show more clearly the two methods of feeding original documents and apparatus for driving the drum.

When the duplicating machine is operated by the flow-feed method, the path of an original document 10 is as shown in FIG. 4. The document is placed on top of the flap 32 and manually introduced into the opening 12. The platen 40 remains stationary in this mode of operation. The original sheet is gripped by driven rollers 54a, 54b, which cause the sheet to pass at a controlled speed across a stationary support glass 56 called a scanning glass. Other rollers 58a, 58b then grip the original sheet 10 and carry it out to the table 16 which serves as an exit station.

The downward side of the document 10 is illuminated by a light source 59 comprising a quartz iodine lamp 60 mounted in an elliptical reflector 62 covered by an infrared reflecting protective glass 64. The lamp 60 is enclosed in a lamp house 66 having heat-radiating fins. Light from the light source 59 strikes the document 10 on scanning glass 56 and reflects downward along a path 68 which represents the input to the optical system. Cooling air is forced past the lamp house 66 by a blower, not shown.

The rollers 54a, 54b, 58a, 58b, which move the original document, are geared together and are driven by a clutch output member 70a which is connected to the drive roller 58a by means of a shaft 72. These elements are shown on FIGS. 5a and 5b. The shaft 72 and others to be described are shown in proportion to their actual lengths in FIG. 5a and are shown greatly elongated in FIG. 5b for clarity. The clutch output member 70a for driving the rollers 54a, 54b, 58a, 58b, is part of a magnetic cluth 70 having an input member 70b fixed to a shaft 76 which is driven from the drum 50 through gears 74, 78, the driving gear 78 being fixed to the drum 50.

The drum gear 78 is driven by one of two motors 82, 86 through a compound gear 80. With this gear arrangement, the roller 58a is driven in close synchronism with the drum 50 when the clutch 70 is engaged because the roller 58a derives its power through the drum gear 78. During the scanning step of machine operation, the compound gear 80 and the drum 50 are driven by the scan motor 82 through a gear 84 mounted at the output of motor 82 and meshing with a portion 80b of the compound gear 80.

Another motor 86 is used to drive portion 80a of compound gear 80 during a duplicating step which follows the scanning step so that compound gear 80 can be driven at a higher speed for duplication than for scanning. The duplicating step causes the image on the drum to be transferred to the paper 18. Paper 18 upon which copies are to be made is shown at the top of drum 50 in FIG. 5a. During the duplication step in the flow-feed mode clutch 70 of the preferred machine is disengaged so that the rollers 54a, 54b, 58a, 58b are not driven. The duplicating motor 86 drives gear 88 which engages a portion 80a of compound gear 80 to turn gear 80 during duplication. In the illustrated embodiment, only one of the motors 82 and 86 is energized at any given time, and each has mounted on its shaft a one-way clutch bearing 90, 92 respectively such as is manufactured by Torrington Corporation to permit gear 84 or gear 88 respectively to idle when power is on the other motor 86 or 82.

A time sequence of machine operation by the flow-feed method begins with engaging of the clutch 70 and energizing of the scan motor 82. Original documents are fed into the rollers 54a, 54b and 58a, 58b which are driven in synchronism with drum 50. As shown in FIG. 5a, light source 59 illuminates the document 10, the light reflected from the document passes downward to the first-surface mirror 44, through lens 46 to the first-surface mirror 48, and is focused to an image at or near the surface of the drum 50. In the duplicating step, the clutch 70 is disengaged, the motor 82 is de-energized, and the motor 86 is energized to drive drum 50 at a greater speed. Plain bond paper 18 passes over the top of the drum 50 and receives an image from a latent image on the surface of the drum. The paper 18 is further processed as will be described below and comes out of the machine at opening 20 or opening 22 as shown in FIG. 1.

In the platen scan method of operation, scanning step and duplicating steps are again executed but the scanning step consists of a forward scan motion of the platen 40 followed by a return motion. During the forward motion, the clutch 70 is disengaged so that the clutch output member 70a is free to move away from the clutch input member 70b as the entire platen 40 moves. A clutch 94 is engaged and a pinion gear 96 which is coaxial with the drum 50 is driven through a gear train as follows from the drum: Power is transmitted from drum gear 78 to a meshing gear 98, through clutch 94 and a communicating gear 100 to the pinion gear 96 which in turn engages a rack gear 102. The axis of the pinion gear 96 is stationary but the rack gear 102 is rigidly mounted on the platen 40 and is utilized to drive the platen with a translational motion. The platen 40 travels on linear bearings 103a, 103b, shown on FIG. 5a, to scan the platen 40 across the input 68 of the optical system.

Figure 5B:
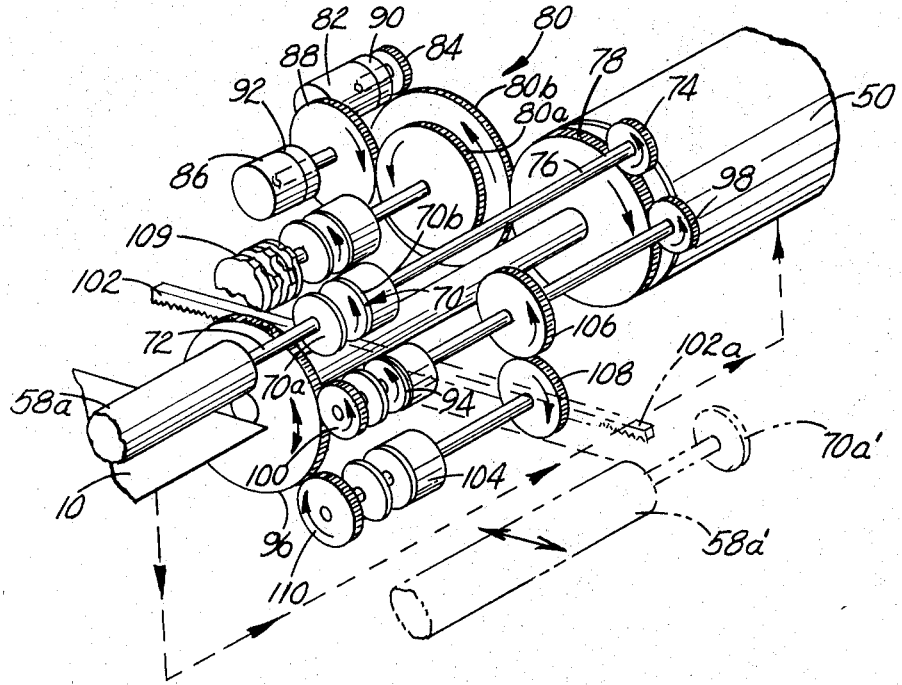

The entire platen 40 including the currently unused rolls 54a, 54b, 58a, 58b, is moved progressively to a position indicated on FIG. 5b by dotted lines, which show the rack gear 102 in a position 102a and the roller 58a in a position 58a' and the clutch member 70a in a new position 70a'. When the platen 40 is in the dotted position 102a on FIG. 5b, it is in the position shown in FIG. 2b.

Return of the platen to its starting position is accomplished by disengaging the magnetic clutch 94 and engaging another clutch 104. The pinion gear 96 is then driven from drum 50 in the opposite direction through a gear train including gears 78, 98, 106, 108, clutch 104 and gear 110. The platen 40 returns to the starting position which is shown in FIG. 2a. As can be seen in FIG. 5b, gear 110 preferably has more teeth than gear 100 so that, with gears 106 and 108 and their shafts turning at the same angular velocity as shown, the restoring movement of the platen will be at a higher speed to conserve operating time.

A sequence of operation of the platen feed method of operation starts by engaging clutch 94 and energizing scan motor 82. A book or other original document 41 on cover glass 34 of the platen 40 is transported past the field of view of the optical system by a linear motion of the rack gear 102; at the same time the drum 50 is rotated in precise synchronism with the motion of the original around the surface of the drum 50. The clutch 94 is then disengaged and the clutch 104 is engaged to return the platen 40 to its starting position. The scan motor 82 is de-energized and the duplicating motor 86 is energized to turn the drum 50 at a higher speed. Bond paper 18 is passed over the top of the drum to produce copies.

The time sequence of operations of the machine is controlled by a set of timing cams and switches 109 shown in FIG. 5b. Limit switches stop the travel of the platen 40 at its extreme forward and rearward positions.

Although one specific preferred embodiment of the invention has been described, the invention can be practiced in other embodiments also. The original document may be transported to a viewing station and stopped there, then be scanned while it is stopped, and then be transported away from the viewing station. The selectable feed system described herein is not limited to scanning types of optical systems but is applicable also to other systems, for example, types in which an entire original document is moved into place at a viewing station of the optical system, and an image of the entire document is cast at once upon an image receiving surface at the output image station. The document may be stopped temporarily at the viewing station while the imaging takes place if desired.

In the flow-feed method for transporting original sheets past the viewing station, the members which grip the original sheets 10 need not be rollers, as described in the preferred embodiment above. They may instead take other forms, for example, frictional fingers which move in translation after gripping the original document.

The surface which receives the image at the output image station of the optical system need not be a drum but may instead be a flat surface or a surface of a flexible belt having some other contour. Nor is it essential that the drum be operated at a different speed during the duplicating step than during the scanning or image receiving step of the reproduction process.

The invention may be practiced with a stationary surface instead of with a moving surface for receiving the image. The image may be scanned by moving a component of the system, other than the image receiving surface, for example by rotating a mirror in the optical path.

If a latent image process is used, the duplicating step may be carried out simultaneously with the scanning step by locating the copy-making apparatus on the other side of the drum from the image receiving station.

It is not necessary that the reproduction process be of the latent-image type in which the duplicating step is carried out separately from the scanning step. Instead, sensitized paper for copies to be duplicated may itself pass the output image station of the optical system and receive the optical image directly.

What is claimed is:

1. Copying apparatus comprising optical image forming means having an input illumination station and an output image station, first means for document feeding comprising carriage means supporting a document and reciprocable for moving a supported document to and from said illumination station by moving said carriage means and said supported document together, alternative means for document feeding contemporaneously mounted on said apparatus with said first means for document feeding said alternative means having means for engaging a document and movable in continuous fashion for moving such engaged document relative to said first means, power means and said illumination station for alternatively driving said first feed means or said alternative feed means, selection apparatus for alternatively associating either said first means of document feeding or said second means of document feeding with said power means, and means located at said output image station for receiving an image of the document.

2. Copying apparatus as set forth in claim 1 wherein the means for receiving an image of the document is a cylinder and in which the power means for alternatively driving said first document feed means and said alternative document feed means includes a gear driving said cylinder at a rotary speed such that its surface speed is synchronized with either document feed means to provide an accurate reproduction of the document on the surface of the drum.

3. Copying apparatus as set forth in claim 2 in which the power means includes, meshing with the cylinder gear and driven thereby, a first gear arranged to drive said carriage means and a second gear arranged to drive said alternative document feeding means.

4. Copying apparatus as set forth in claim 3 in which said first gear is connected to a first drive shaft for driving the carriage means in a scanning direction, and also drives a gear meshing with a gear connected to a second drive shaft for driving the carriage means in a return direction, and in which clutch means are associated with each shaft whereby the carriage means may be driven alternately in opposite directions.

5. Copying apparatus as set forth in claim 4 in which the gear ratios between the first drive shaft and the carriage means and the second drive shaft and the carriage means are such that the carriage means is returned at higher speed than its speed in the scanning direction.

6. Copying apparatus as set forth in claim 2 in which there are provided alternate means for driving the cylinder at a normal scanning speed for copying and at a higher speed for duplicating, and means connecting the normal speed drive with both the cylinder and either one of the document feed means, and for disconnecting the cylinder drive from both document feed means simultaneously, whereby the cylinder can be selectively driven at scanning speed in association with one or the other of said document feed means, or at the higher duplicator speed disconnected from both document feed means.

7. An apparatus for copying documents comprising a frame, a document feed station for receiving a document, and means defining a document illumination station and a sheet exit station, a platen supported on the frame for reciprocating movement between said document feed station and said illumination station to carry a document to be copied from said feed station to said illumination station and return, sheet transport means carried on said frame contemporaneously with said platen and operative alternatively with respect thereto for receiving a document sheet at said feed station and transporting such received document sheet relative to said platen from said feed station to said illumination station and then to said sheet exit station, and drive means connectable with said transport means and operable for unidirectionally driving said transport means to move a document sheet relative to said platen from said feed station to said illumination and exit stations in sequence, and disconnectable from said sheet transport means to permit reciprocation of said platen between said feed station and said illumination station.

8. Copying apparatus in accordance with claim 7 in which said sheet transport means comprises sheet forwarding rollers mounted on said platen and movable therewith, said rollers being operatively connectable with said drive means and effective to forward documents only when said platen is inactive, and being disconnectable from said drive means so as to be inactive when said platen is connected to said drive means.

* * * * *